(12) United States Patent
De'Longhi

(10) Patent No.: US 7,370,572 B2
(45) Date of Patent: May 13, 2008

(54) MACHINE FOR COFFEE BEVERAGE PRODUCTION

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 507 days.

(21) Appl. No.: 10/510,613

(22) PCT Filed: Oct. 21, 2003

(86) PCT No.: PCT/EP03/11643

§ 371 (c)(1),
(2), (4) Date: Oct. 6, 2004

(87) PCT Pub. No.: WO2004/069012

PCT Pub. Date: Aug. 19, 2004

(65) Prior Publication Data

US 2005/0139080 A1   Jun. 30, 2005

(30) Foreign Application Priority Data

Feb. 7, 2003  (IT) ........................ MI2003A0219

(51) Int. Cl.
*A47J 31/40* (2006.01)
(52) U.S. Cl. ................... 99/302 P; 99/289 R
(58) Field of Classification Search ............. 99/302 P, 99/297, 280, 281, 282, 283, 289 R, 287, 99/279; 426/433
See application file for complete search history.

(56) References Cited

U.S. PATENT DOCUMENTS

| 4,681,028 A | * | 7/1987 | Schmed et al. ........... 99/289 R |
| 4,784,050 A | | 11/1988 | Cavalli |
| 5,344,067 A | * | 9/1994 | Axelsson et al. .......... 236/12.2 |
| 5,878,654 A | | 3/1999 | Kobayashi |
| 5,964,142 A | * | 10/1999 | Tio ........................... 99/289 R |

FOREIGN PATENT DOCUMENTS

| DE | 198 48 370 | 4/1999 |
| EP | 0 937 432 | 8/1999 |

* cited by examiner

Primary Examiner—Reginald L. Alexander
(74) Attorney, Agent, or Firm—Andrew Wilford

(57) ABSTRACT

The machine for producing coffee beverages comprises a device to contain coffee powder and another device to supply a fluid to produce the coffee beverage, both devices being reciprocally mobile so that when connected together they form a coffee powder infusion chamber. The container device connected to the machine is removable. The machine comprises an interception tap for water or liquid in the form of a hollow body having at, least a first and second communicating space with the exterior and equipped with a piston connected in sliding mode to the internal part, forming together with said body at least four chambers inside which steam or liquid can be passed alternatively. The fluid supply device is connected to the boiler so that it is heated by the heat dispersed from the boiler.

10 Claims, 21 Drawing Sheets

MACHINE FOR COFFEE BEVERAGE PRODUCTION

CROSS REFERENCE TO RELATED APPLICATIONS

This application is the US national phase of PCT application PCT/EP2003/011643, filed 21 Oct. 2003, published 19 Aug. 2004 as WO 2004/069012, and claiming the priority of Italian patent application MI2003A000219 itself filed 7 Feb. 2003.

FIELD OF THE INVENTION

The present invention relates to a machine for producing coffee. More particularly this invention concerns an espresso machine.

BACKGROUND OF THE INVENTION

Traditional machines comprise a device to hold the ground coffee and the water united in a single unit that also forms the ground coffee infusion chamber; moreover, the machines also include a dosing device for the ground coffee, a moving action mechanism, a boiler, etc.

In the known machines, the container-supply device is removable, for example, for cleaning or maintenance purposes. In fact the container-supply device is the part that is most often soiled because it is always in contact with the ground coffee and because the infusion operation occurs inside this device.

However, washing of this device is extremely difficult, and in certain cases, can also damage the machine. In fact, it is very complicated to obtain access to the internal parts of the container-supply device, and this hinders correct and complete cleaning, especially of the filter.

Moreover, since the container-supply device includes parts that move relative to one another, it is possible that the lubricant is removed, or that certain components are removed or displaced from their correct position during washing operations. The consequences are easy to imagine, both in terms of possible machine damage and in terms of unsatisfactory coffee quality.

A further problem with traditional machines concerns the fact that the machine will produce good quality coffee only when the intervals between one coffee production operation and the next are very short. In the machines for the production of a coffee (in particular domestic versions) that are used with average frequency, the time lapse between the preparation of one cup of coffee and the next is generally too long to guarantee that the internal machine parts, and in particular the water pipes, are still hot. Therefore the quality of the coffee produced by the machine is limited.

OBJECTS OF THE INVENTION

Therefore the technical task proposed by the present invention is to realize a machine to produce coffee that will eliminate the technical problems known in prior art.

Within the context of this technical task, one object of the invention is to realize a machine that can be washed easily and without the risk of damaging the components.

Another object of the invention is to realize a machine equipped with parts that are all easily accessible. In particular, the internal portions of the component adapted to contain the ground coffee, always particularly exposed to soiling risk even when separated from the machine, are easily accessible according to this invention. This permits the maximum possibility of rapid complete cleaning, especially of the filter.

A further object of the invention is to realize a machine that can be washed without accidental removal or displacement of consumer elements or parts such as the mechanism lubricant.

SUMMARY OF THE INVENTION

The technical task, as well as these and other objects, according to the present invention are attained with the realization of a machine for producing coffee wherein the container can be removed from the machine, the container being connected to a moving mechanism adapted to displace the container from one position spaced from the supply device to a position attached to the supply device, the container having first and second connections to the moving mechanism, the first connection comprising at least one rotating pin and the second connection comprising hook-up couplings connected to a slide on the moving mechanism, mobile in relation to the pin, the slide exerting traction on the container to bring the latter in the position attached to the supply device.

BRIEF DESCRIPTION OF THE DRAWING

Further characteristics and advantages of this invention will be made clearer with the description of a preferred but not exclusive embodiment of the machine according to the invention, illustrated in an indicative but not limitative manner in the appended drawings wherein:

FIG. 19 illustrates the coffee container separate from the machine, while FIG. 20 illustrates the coffee container incorrectly or only partially connected to the machine so that the micro-switches will not enable the machine to produce the coffee, and lastly FIG. 21 illustrates the position of the coffee container when it is connected to the machine correctly, so that the microswitch will transmit the consent to the machine to produce the coffee.

SPECIFIC DESCRIPTION

Figure 10:
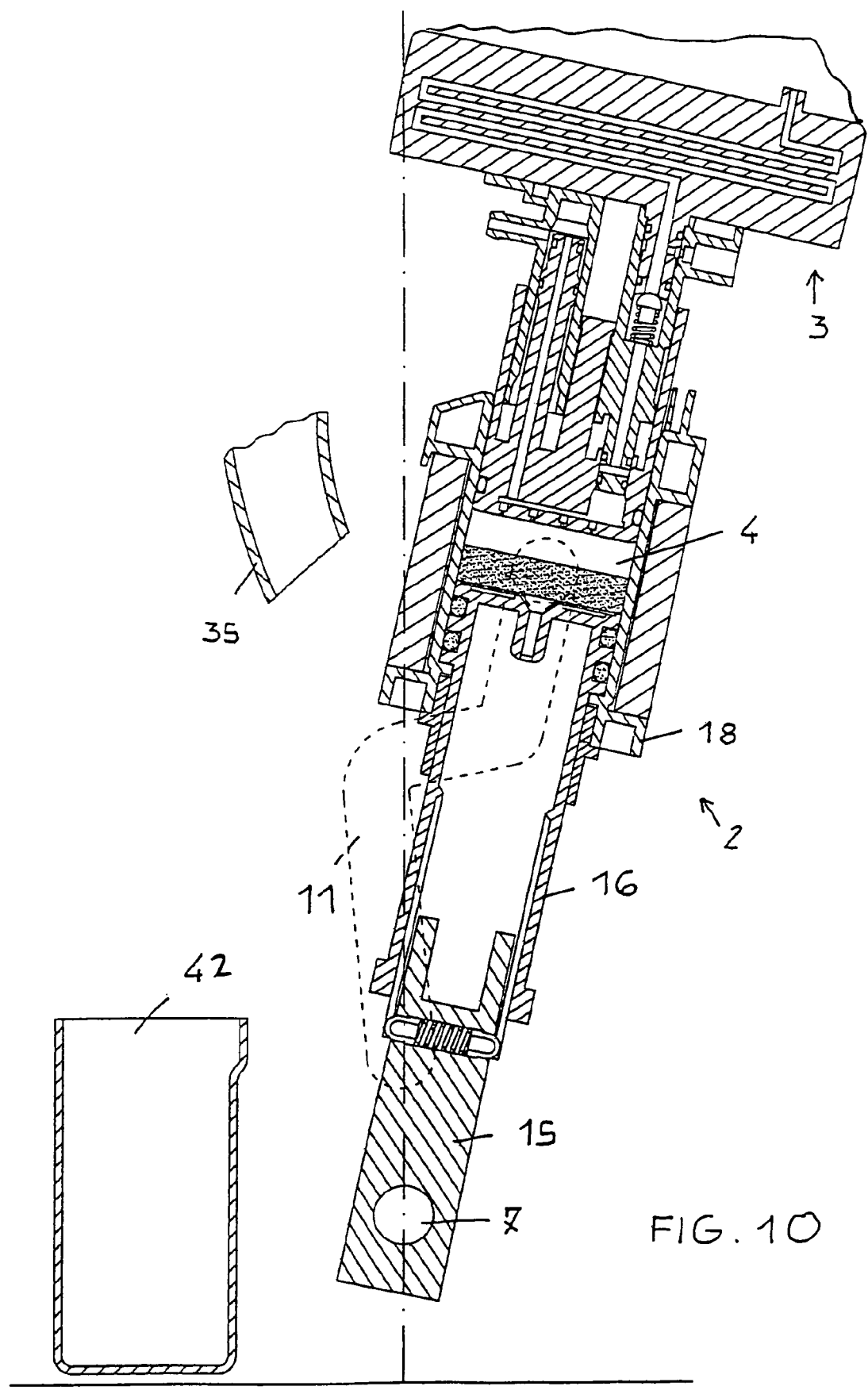
FIGS. 10, 11, and 12 show a schematic cross-section of a portion of the machine in positions wherein the ground coffee container is successively positioned further away from the fluid supply device.
Figure 11:
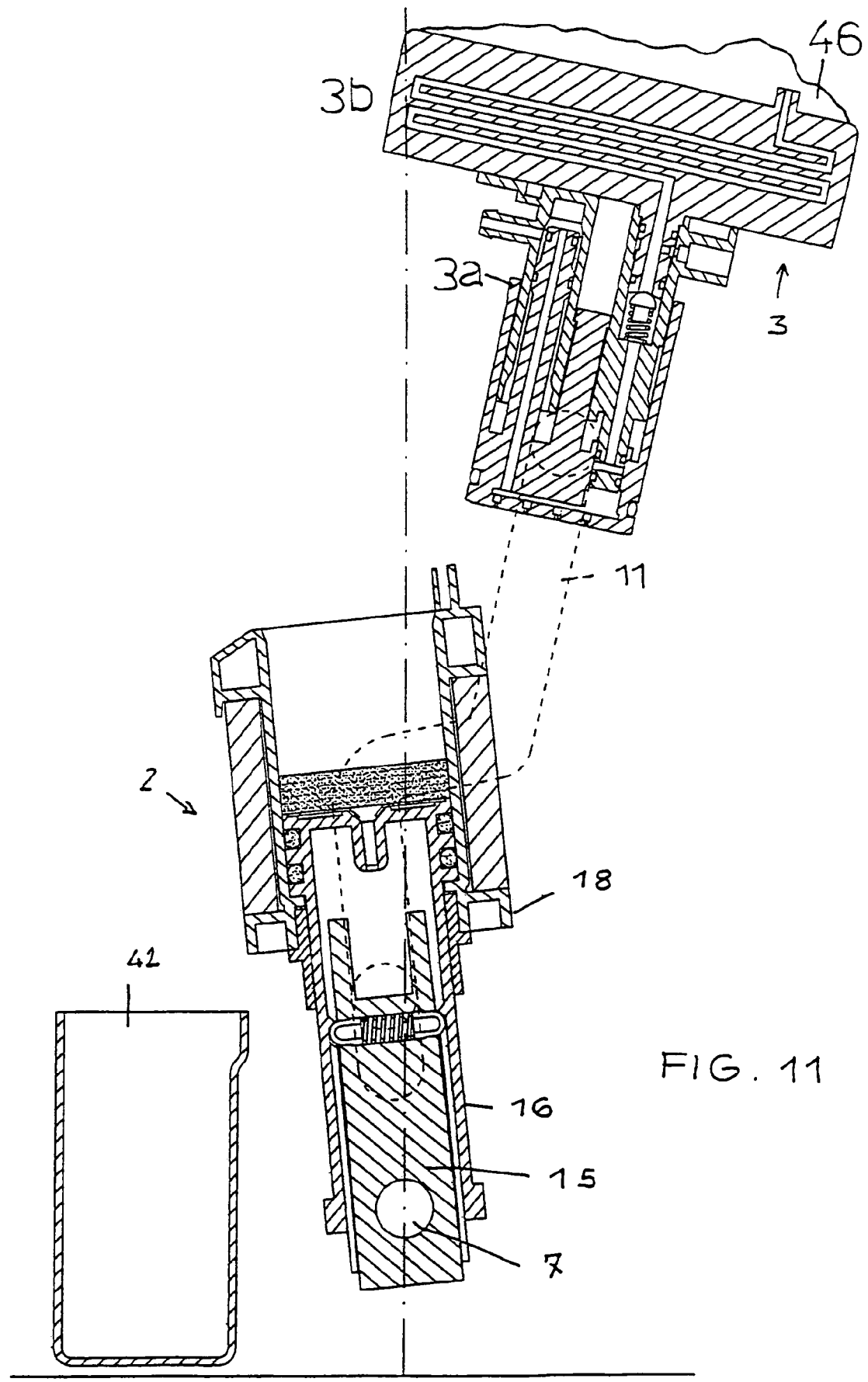

In reference to drawing, the coffee machine is indicated throughout with the reference numeral 1. It comprises a ground coffee container 2 and a fluid supply device 3 for producing the coffee, where both devices are reciprocally mobile so that when they are connected together they form a coffee infusion chamber 4 (FIG. 10).

Advantageously, the container 2 is removable from the machine 1 so that it can be separated therefrom. In particular, the container 2 is connected to a pivot assembly 2a (FIG. 5) adapted to move the container 2 from a position spaced from the supply device 3 (FIGS. 6-8 and 11-14) to a position attached to the supply device 3 (FIGS. 9 and 10).

Figure 4:
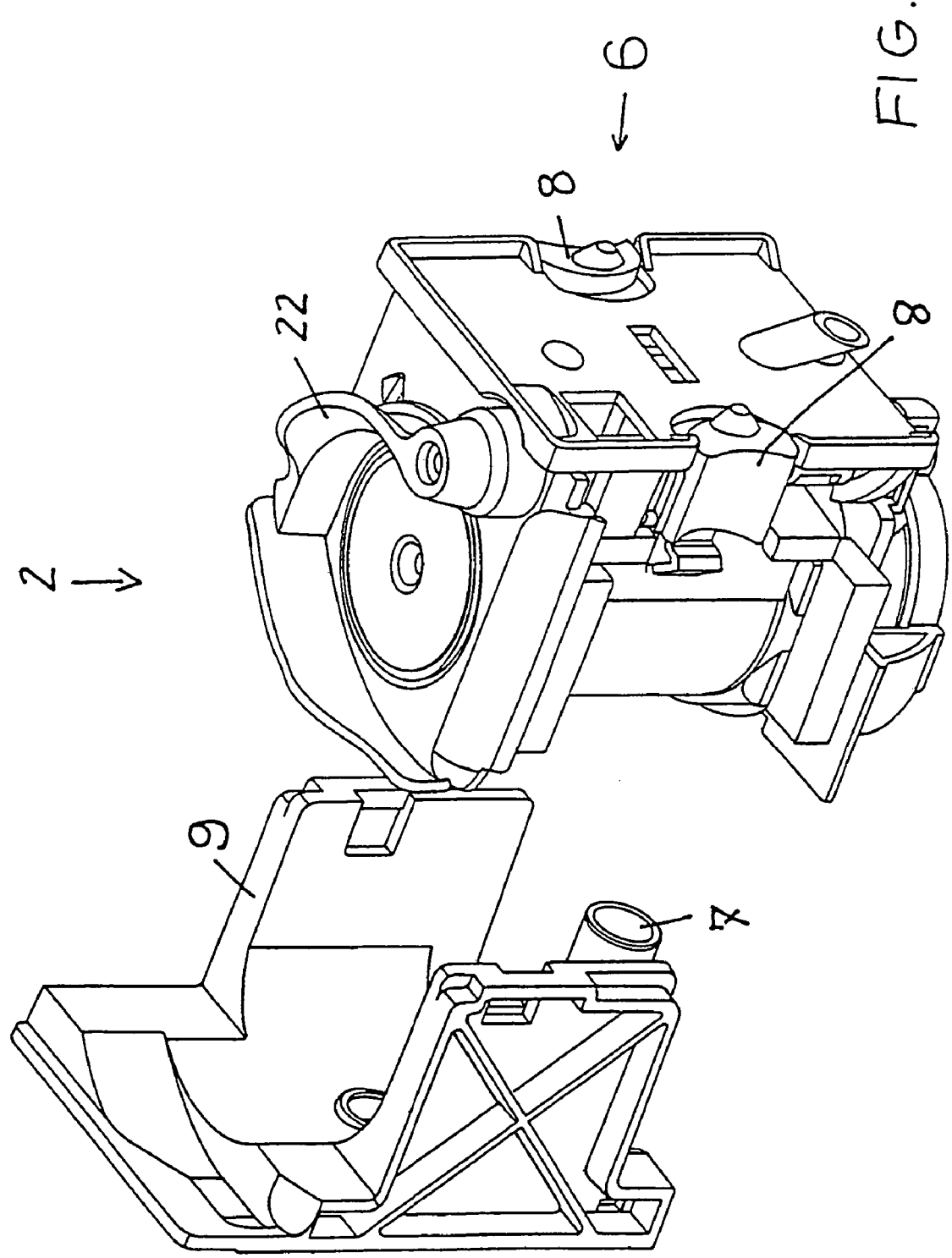
FIG. 4 shows an exploded perspective view of the ground coffee container.
Figure 5:
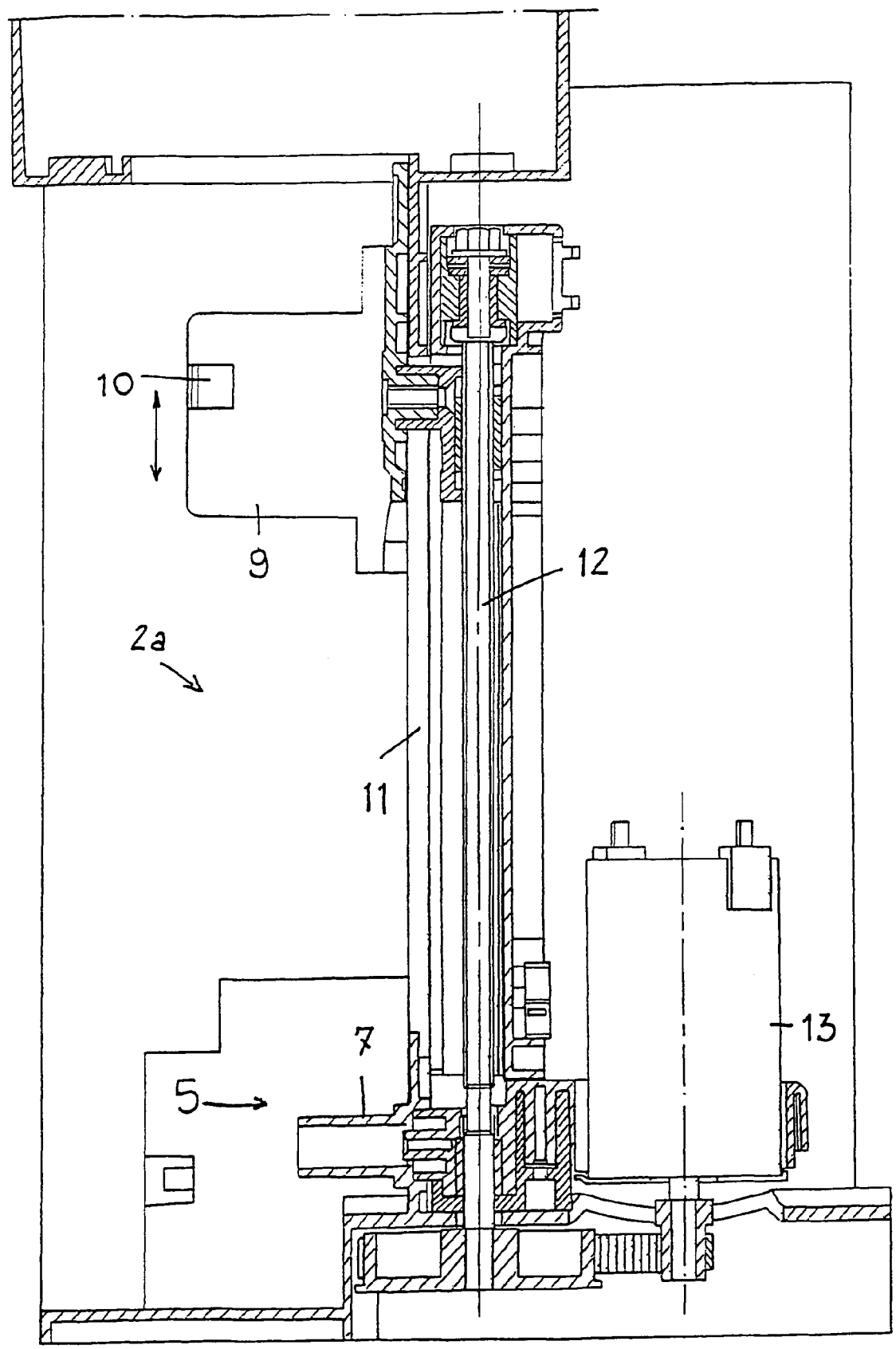
FIG. 5 shows a lengthwise cross-section of a moving mechanism device according to this invention.

The container 2 has first and second connections 5 and 6 to the pivot assembly 2a, where the first connection 5 (FIG. 5) comprises at least one pivot pin 7 for container insertion, and the second connection 6 (FIG. 4) comprises couplings 8 for connection to a slide 9 of the pivot assembly 2a which is mobile in relation to the pin 7. FIG. 5 shows that the slide 9 has seats 10 for connection to the couplings 8. The pivot pin 7 is preferably fixed and positioned lower than the slide 9.

The slide 9 can slide vertically along a guide 11 that controls at least the angular motion of the container 2 on the pin 7. In addition, the slide 9 is also connected to a drive screw 12 that is rotated by an electric motor 13.

Basically the motor 13 can rotate the screw 12, and in cooperation with the guide 11, the screw 12 prevents the slide 9 from rotating together with the screw 12, causing translation of the slide 9 along the screw 12 and pivoting of the container 2 around the pin 7 controlled by the shape of the guide 11.

As shown in the FIGS. 6 through 14, the container 2 comprises at least three telescopic elements 15, 16, 18 that are connected to each other and relatively slidable. The first telescopic element 15 is set on the pivot pin 7, the second telescopic element 16 is slidable on the first telescopic element 15, and the third telescopic element 18 is slidable on the second telescopic element 16 and adapted to house at least one portion of the supply device 3 to form the infusion chamber 4.

Advantageously, the second telescopic element 16 has first abutments 19 (FIG. 8) adapted to act with second elastic abutments 20 of the first telescopic element 15, such that, during the extension stage of the container 2, the first and second abutments 19 and 20 control sliding of the third telescopic element 18 in relation to the first and second telescopic elements 15, 16, and during the retraction stage of the container 2, they control sliding of the second and third telescopic elements 16 and 18 in relation to the first telescopic element 15, and then sliding of the third telescopic element 18 in relation to the second telescopic element 16.

Moreover, the machine comprises a means of expulsion 22 (FIG. 4) for the waste ground coffee from the container 2. The means of expulsion 22 is, for example, an expeller lever connected to a double helix with pinion controlled rotation action. In this manner the expeller lever 22 is continually guided during ground coffee expulsion, limiting the danger of the granules blocking the mechanism and preventing correct machine function.

Figure 1:
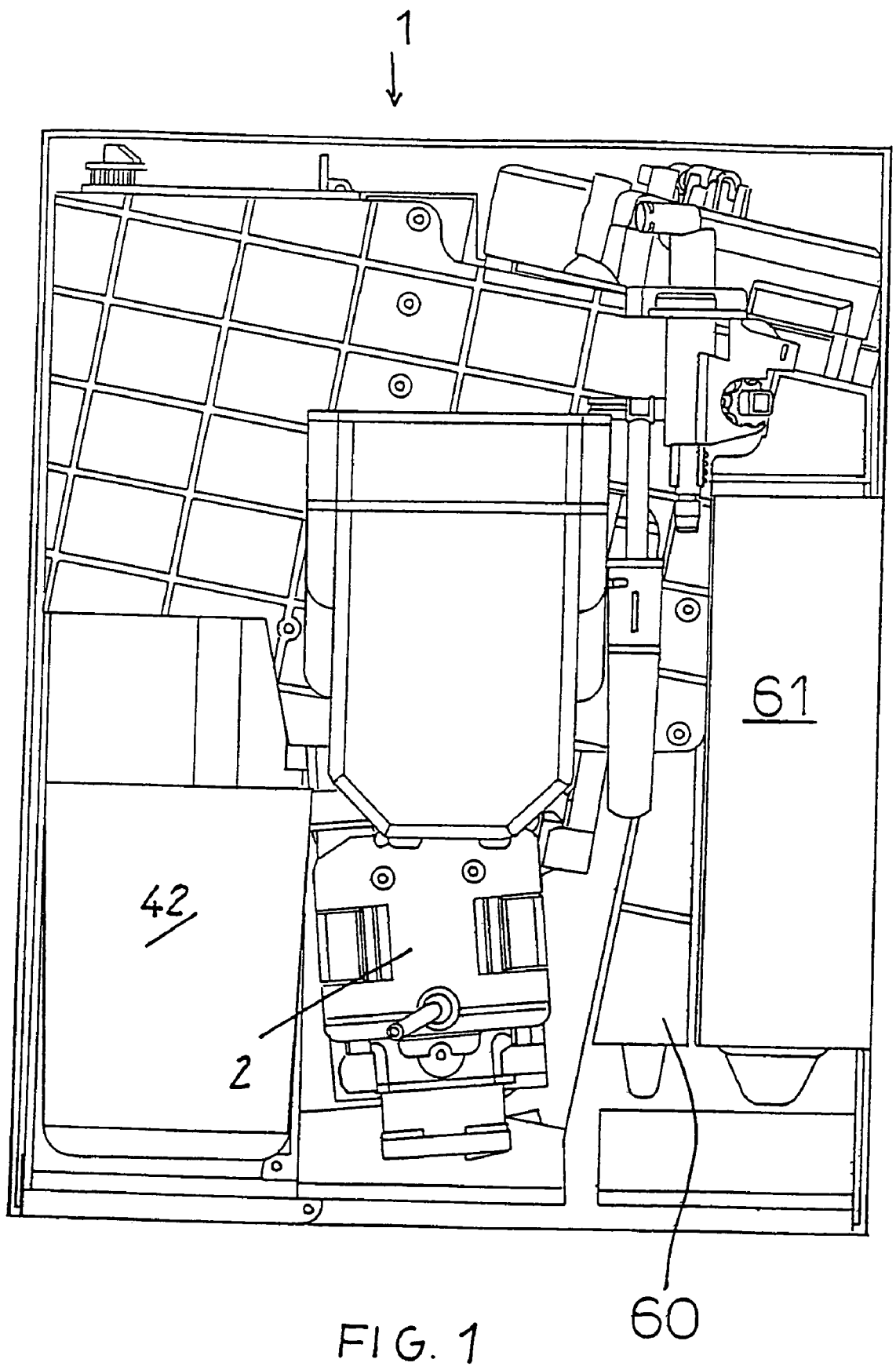
FIG. 1 shows a schematic view of the machine according to the invention.

Advantageously, according to the present invention, the machine 1 comprises as shown in FIG. 1 an expansion chamber 60, that has a flattened configuration having a basically truncated cone shape, interposed between a water tank 61 and the container 2 and supply device 3.

Figure 2:
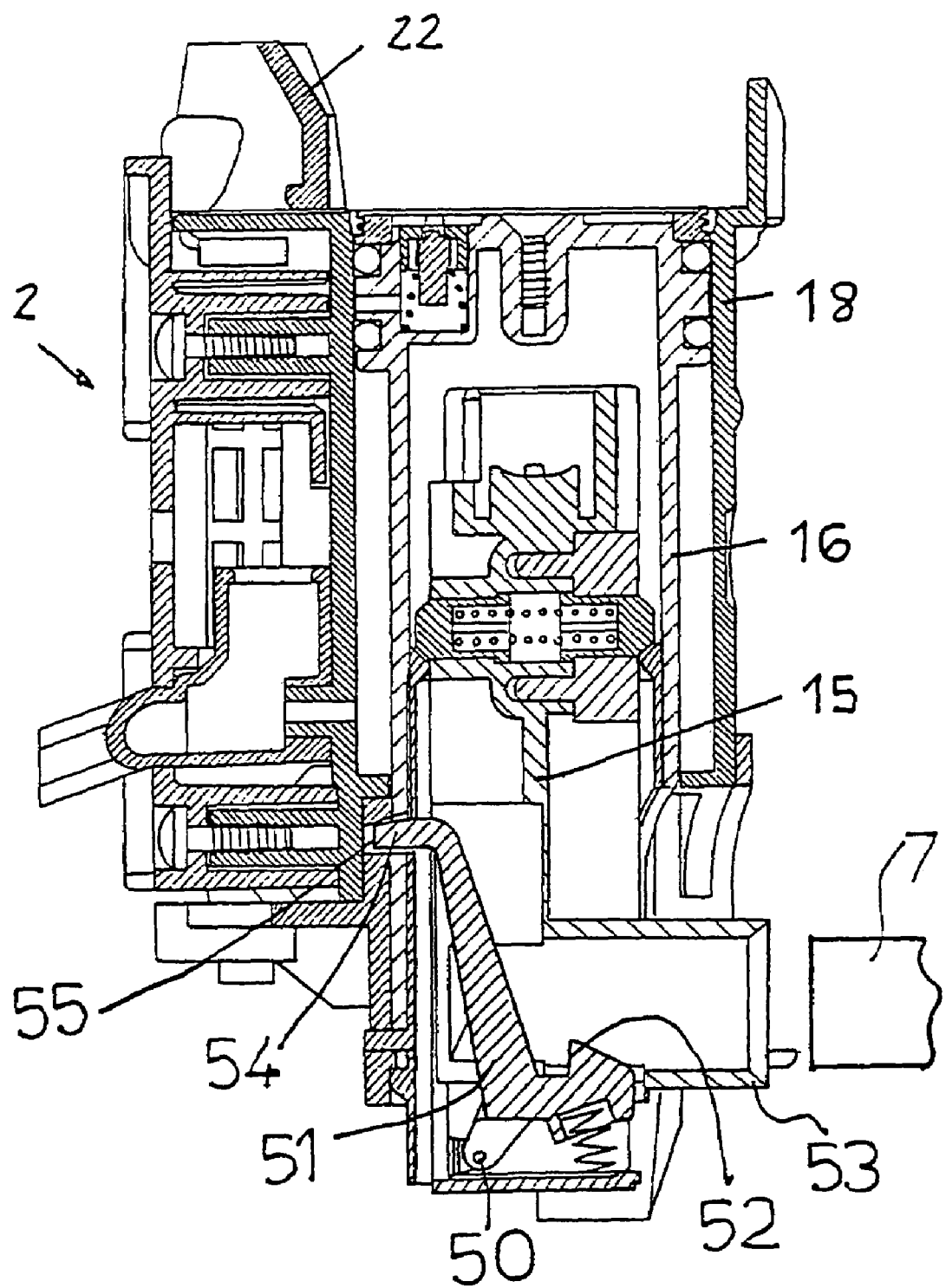
FIGS. 2 and 3 show a cross-section of the container in two different positions.
Figure 3:
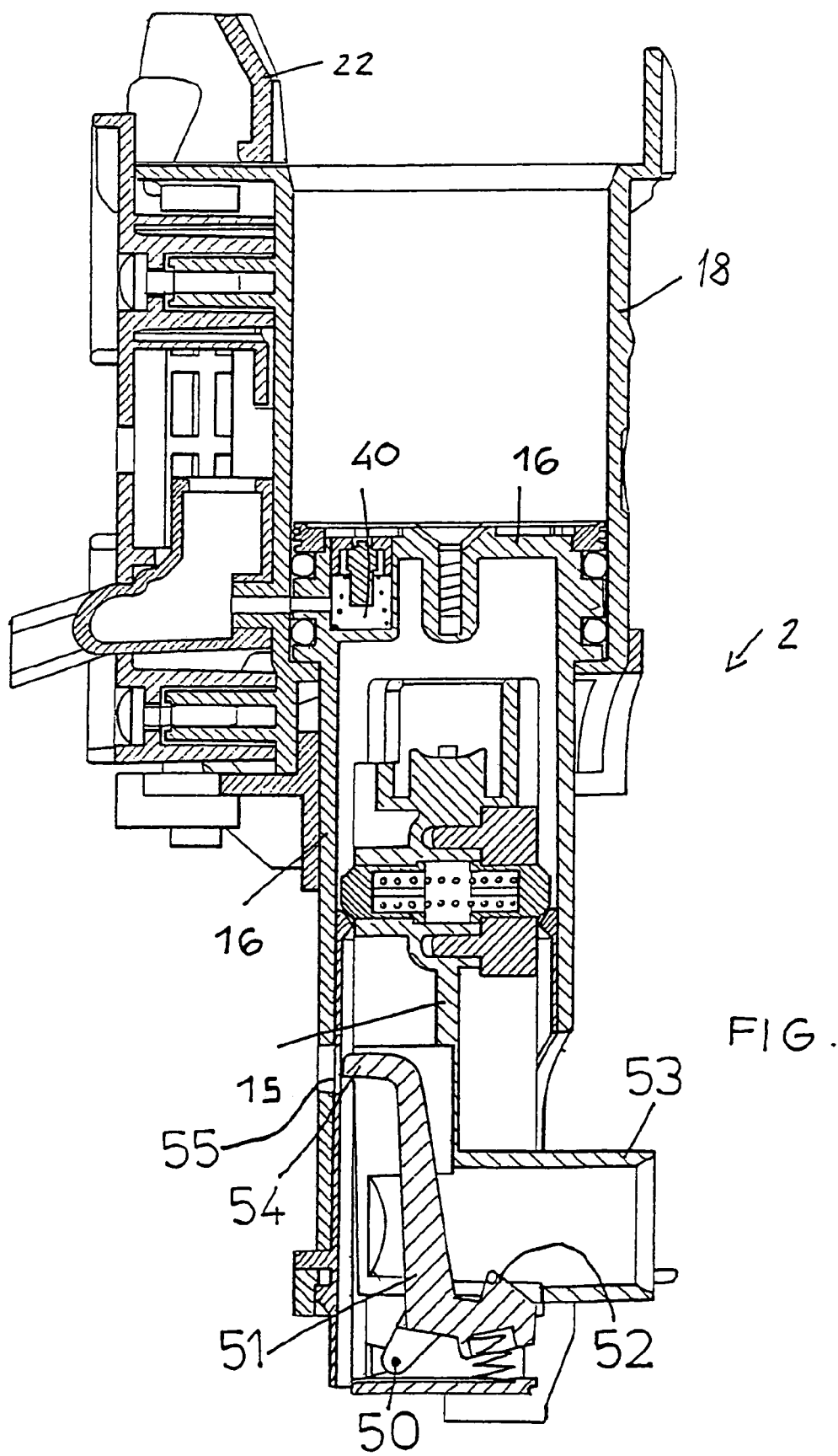

The ground coffee container 2 that can be separated from machine 1, for example for washing purposes, has a blocking element adapted to maintain all the parts that compose the unit in correct position. As is shown in particular in FIG. 2, the blocking element is a lever 51 hinged at 50 to the first telescopic element 16. The lever 51 has a protruding portion 52 inside a tubular portion 53 adapted to house the pin 7.

The lever 51 has a right-angled end 54 that fits into aligned holes 55 of the second and third telescopic elements 16 and 18 to prevent them from extending when the container 2 is disconnected from the machine 1.

When the container 2 is connected to the machine 1, the pin 7 rotates the lever 51 around the hinge 50 countering a spring action and causing the end 54 to pull out of the aligned holes 55, permitting the extension of the tubular elements 15, 16, and 18.

Figure 19:
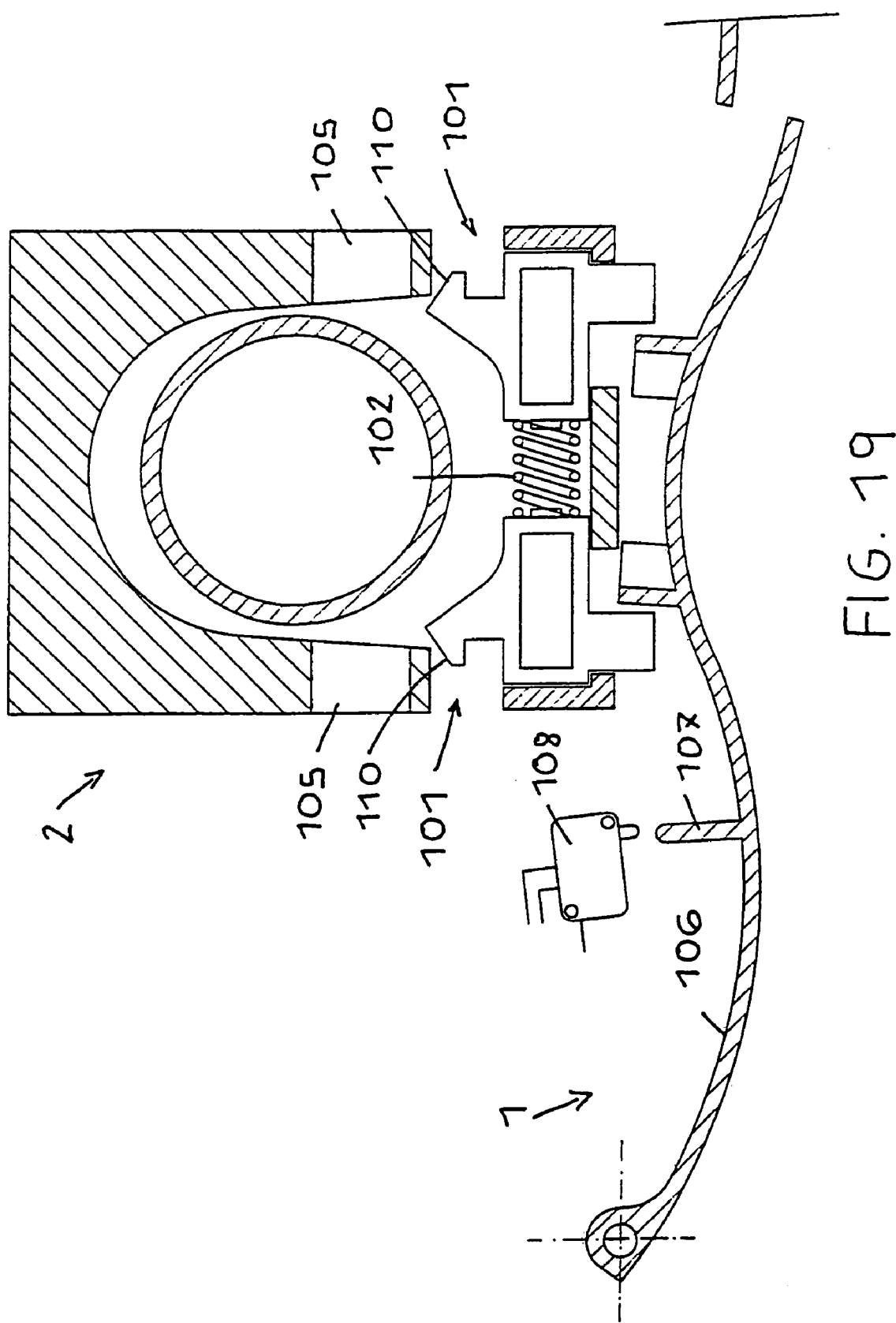
FIGS. 19, 20, and 21 show a schematic section of a system for connecting the coffee container to the machine. In particular.
Figure 20:
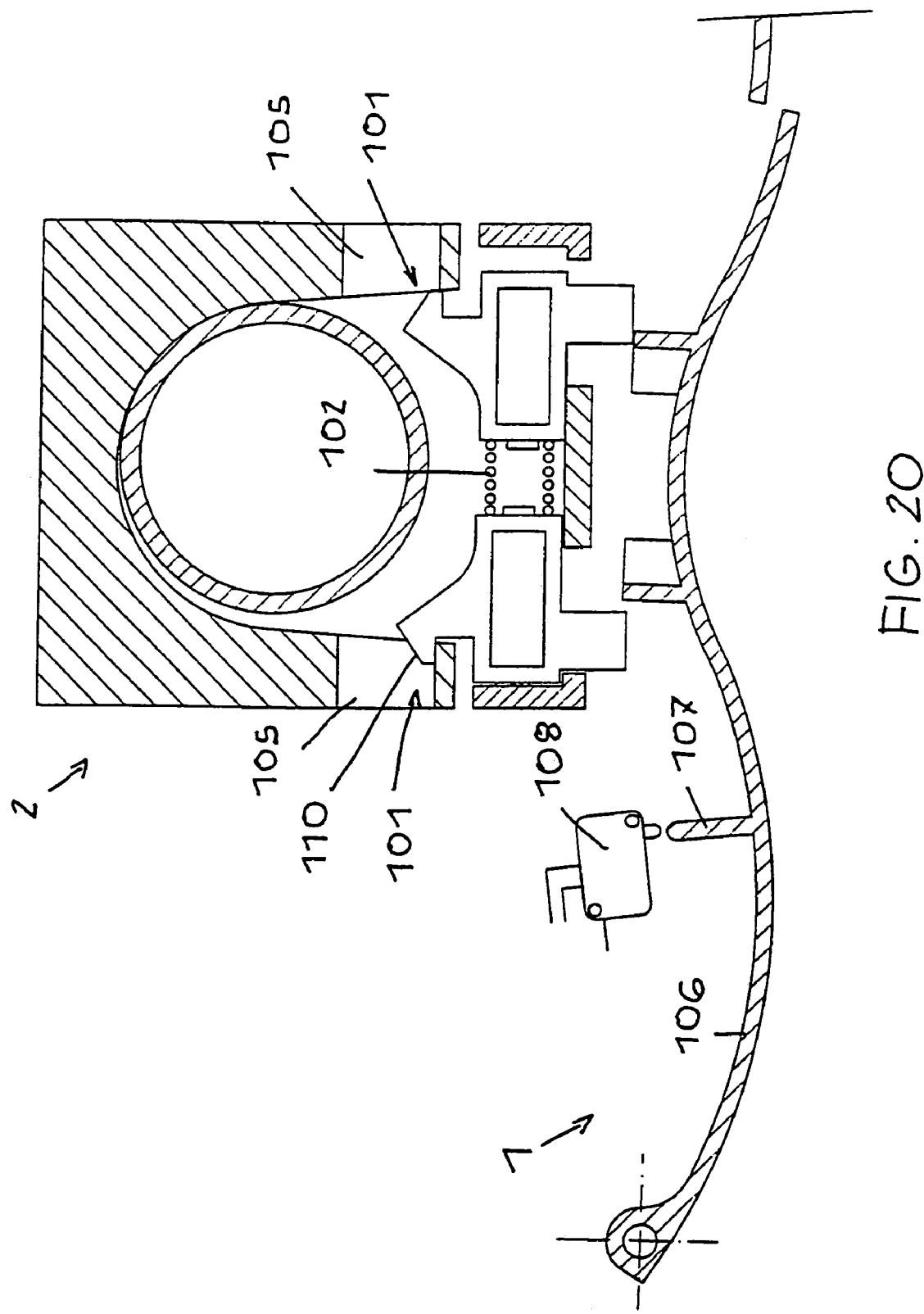
Figure 21:
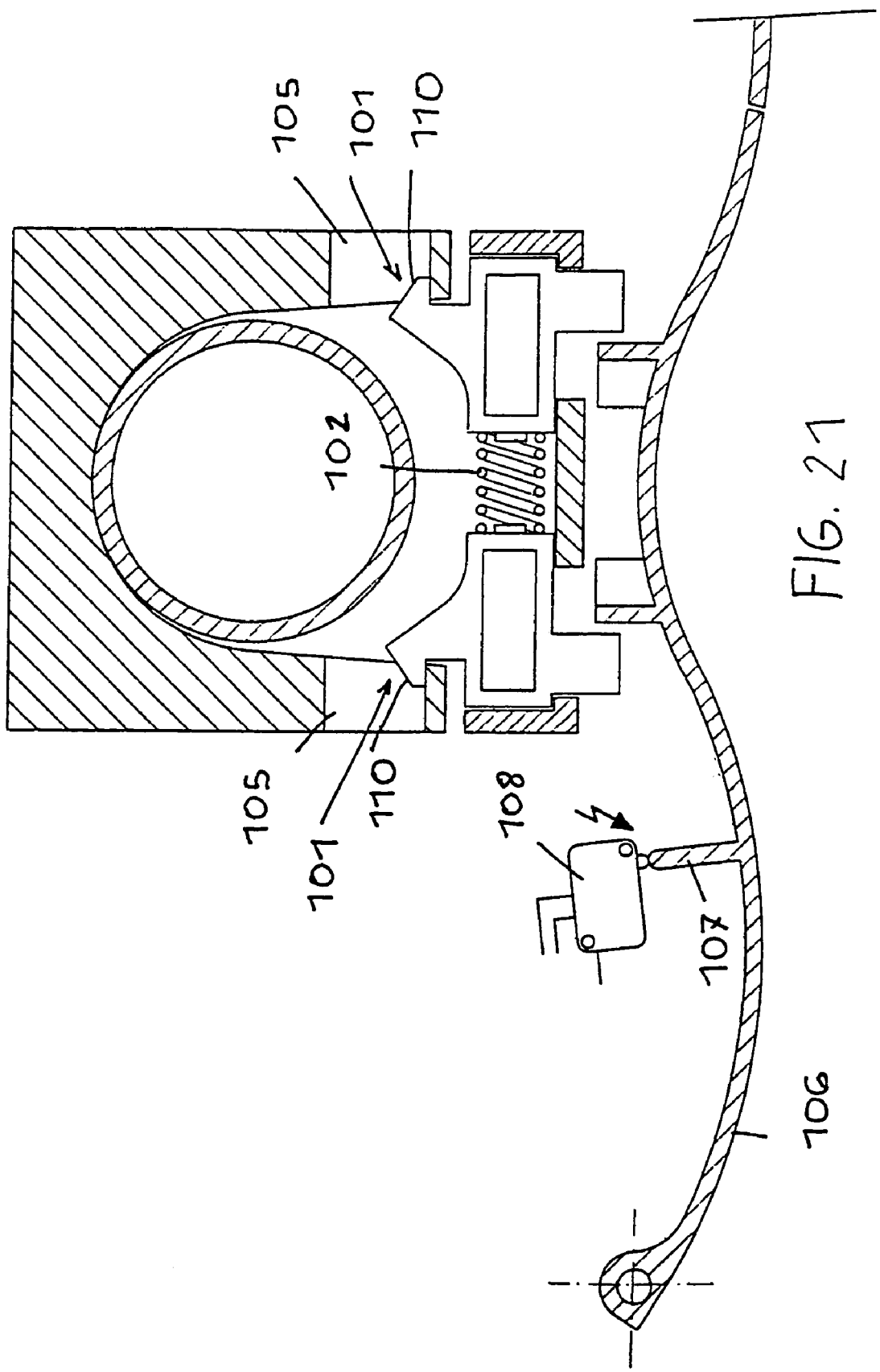

As shown in FIGS. 19, 20, and 21, mobile hooking teeth 101 can move toward each other against the force of a spring 102 in order to connect the container 2 to the machine 1. When the container 2 is connected in the optimal manner to the machine 1, the teeth 101 are inserted correctly into holes 105 permitting the correct closure of a cover 106, and a pin 107 triggers a microswitch 108 that permits the machine 1 to produce coffee.

However after the elements have been disassembled, for example for washing purposes, if they are not re-assembled correctly by the user because the teeth 101 are partially, and/or incorrectly or not at all inserted in the holes 105, the cover 106 will not close correctly because of angled faces 110 of the teeth 101 and the pin 107 will not trigger the microswitch 108, thus preventing all machine function.

Advantageously, the machine 1 according to this invention comprises a water or steam interception tap 25 (FIGS. 15-18) adapted to intercept water or steam that exits from the machine, and positioned upstream of the container 2 and supply device 3. It is especially practical that when the tap 25 is turned to one of its positions, it is adapted to activate or deactivate one or more of the microswitches (not shown in the appended drawings for clarity) that control the switch-on or switch-off of a water supply pump to boiler 46 (FIGS. 7-9), and/or the switch-on or switch-off of electric resistors/elements in the boiler 46.

The tap 25 has a body 26 having at least first and second communicating passages 27 and 28 opening to the exterior, and is equipped with a piston 29 connected internally in sliding mode. Together with the body 26, the piston 29 forms at least four chambers 30, 31, 32, 33, which can deliver water or steam alternatively.

The chambers 30, 31, and 32 are formed by grooves formed on the piston 29 and the fourth chamber 33 has a variable volume and is formed between the end wall of the hollow body 26 and the end of the piston 29. Advantageously, the first chamber 30 is connected to a duct 30a that opens at the end of the piston 29, a second chamber 31 is closed, a third chamber 32 is connected to a duct 32a that opens to the exterior from the tap 25, and the fourth chamber 33 is connected to the passage 28 of the water or steam supply on exit from the machine.

Moreover, in a preferred embodiment, the first passage 27, (used for feeding water or steam into the tap 25) is formed on a side portion of the body 26, and the second passage 28 (used for water or steam discharge from tap 25) is formed in the end wall of the hollow body 26.

The function of the machine for producing coffee s according to this invention is obvious from the descriptions and illustrations, and in particular, is basically as follows.

Figure 15:
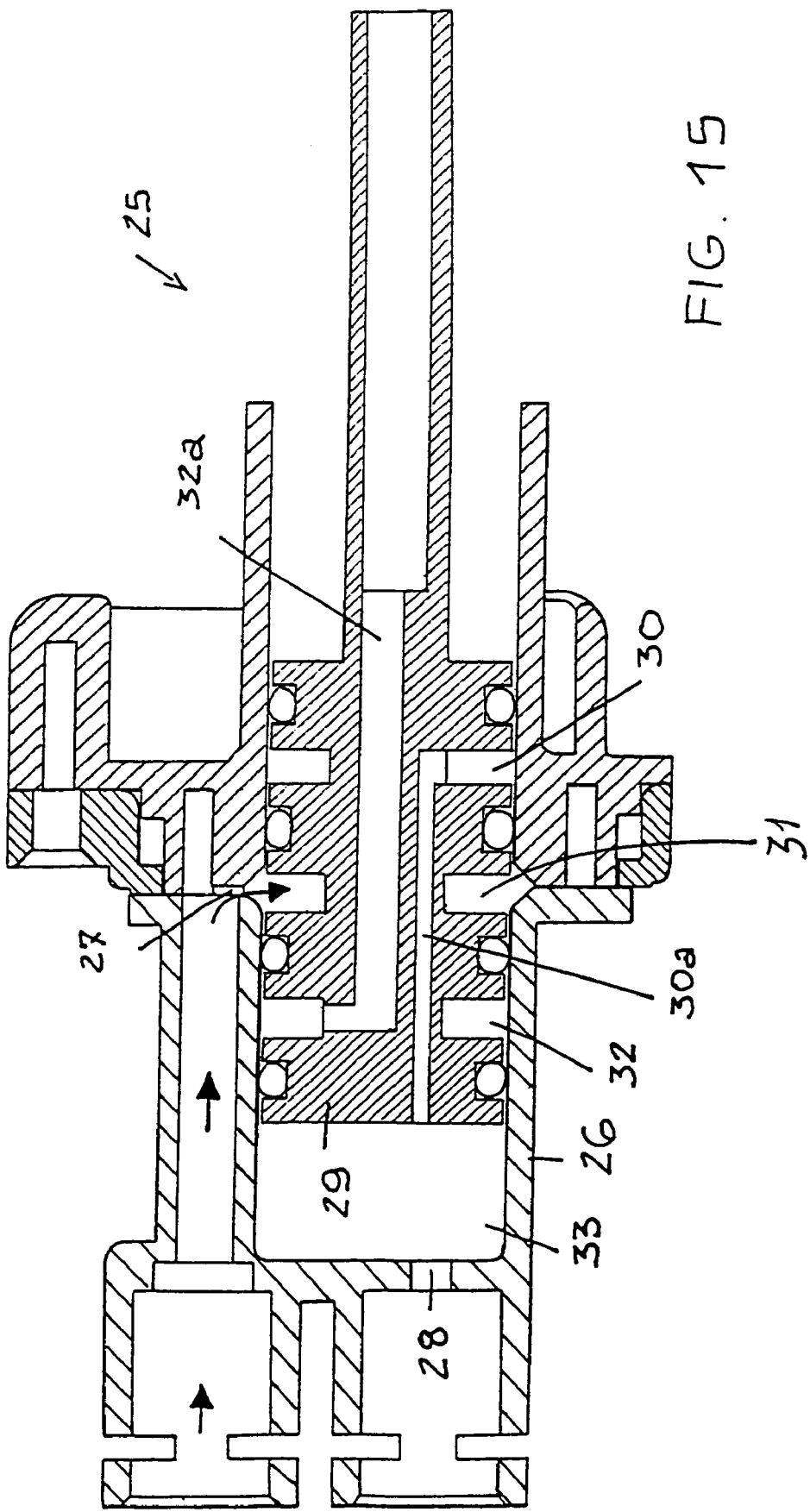
FIGS. 15-18 are sectional views through a tap on the machine that delivers liquid or steam in four different positions.

The tap 25 is initially positioned in the position shown in FIG. 15, with the chamber 31 communicating with the fluid entry passage 27. In this position the pumps and the boiler resistors/elements are deactivated; no fluid can enter the interior of the tap 25 or exit from the machine 1.

Figure 16:
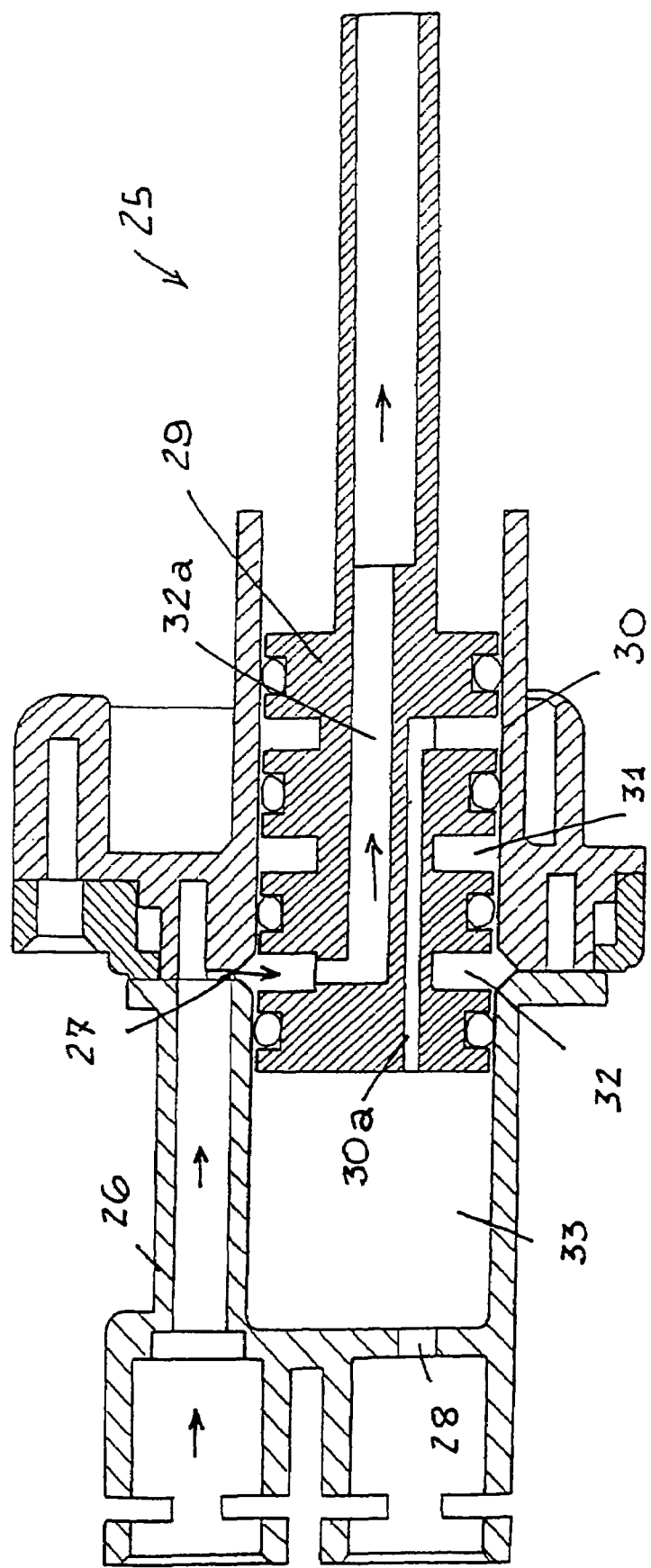
Figure 17:
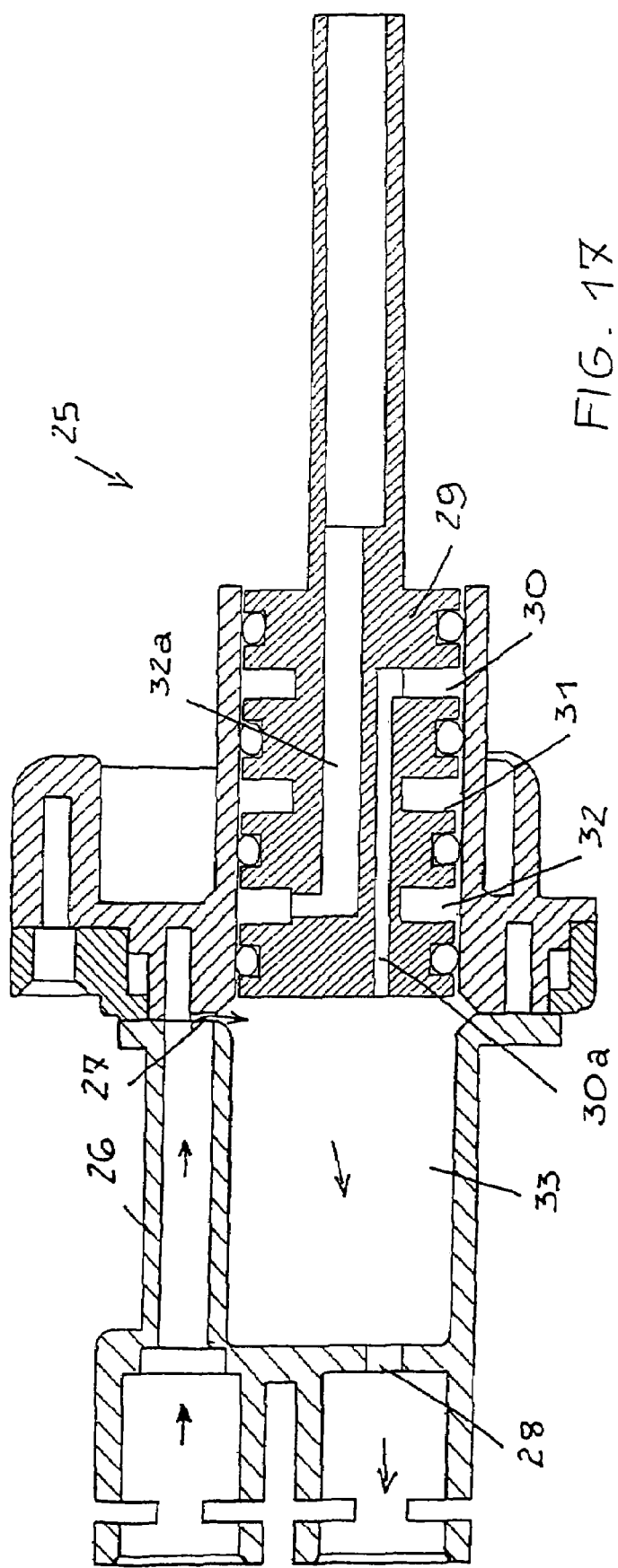

Two examples are shown in FIGS. 16 and 17 to demonstrate how the boiler 46 feeds the tap 25 with steam. FIG. 16 shows the boiler pre-heating configuration where the passage 27 communicates with the chamber 32 that in turn communicates with the duct 32a that opens outside the tap 25. The boiler supply pump is switched off while the boiler resistors/elements collaborate with a temperature sensor to control the temperature in the boiler 46 to produce steam. In this position the forming of any possible pressure in the boiler 46 is prevented during the pre-heating stage because the steam is discharged into an expansion chamber 60.

However FIG. 17, re shows the configuration where steam is used. In this position, the passage 27 communicates with the variable volume chamber 33 because the piston 29 is positioned at the maximum distance from the end wall of the hollow housing 26. The steam passes through the passage 27 and enters the chamber 33 and is sent for use through the passage 28. In this position the boiler pump and resistors/elements are activated to send water into the boiler 46 (which is set at the temperature attained during the pre-heating stage), the water turns to steam, and the steam is supplied to the user.

Figure 18:
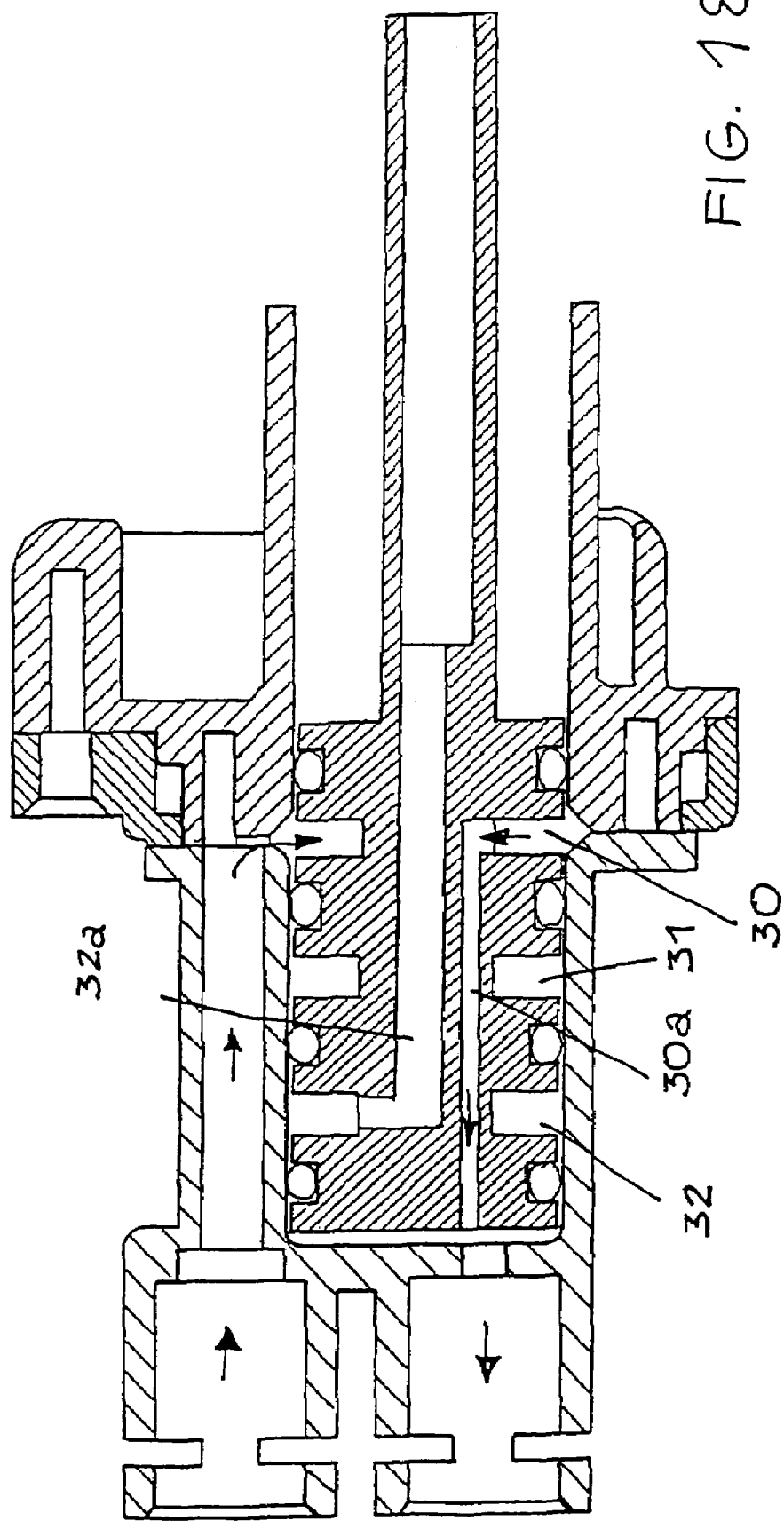

FIG. 18 show the configuration in which tap 25 supplies water to the machine 1. In this case the passage 27 communicates with the chamber 30 that in turn is connected to the duct 30a that opens at the end face of the piston 29. Therefore the water passes through the duct 30a and is sent for use through the passage 28. In this position the boiler pump and resistors/elements are activated to send water into the boiler 46 (which was brought under thermostat control in a transitory stage to the suitable temperature to produce hot water). The water is then sent to the user. When the tap supplies water to the fluid supply device 3, coffee can be produced.

Figure 6:
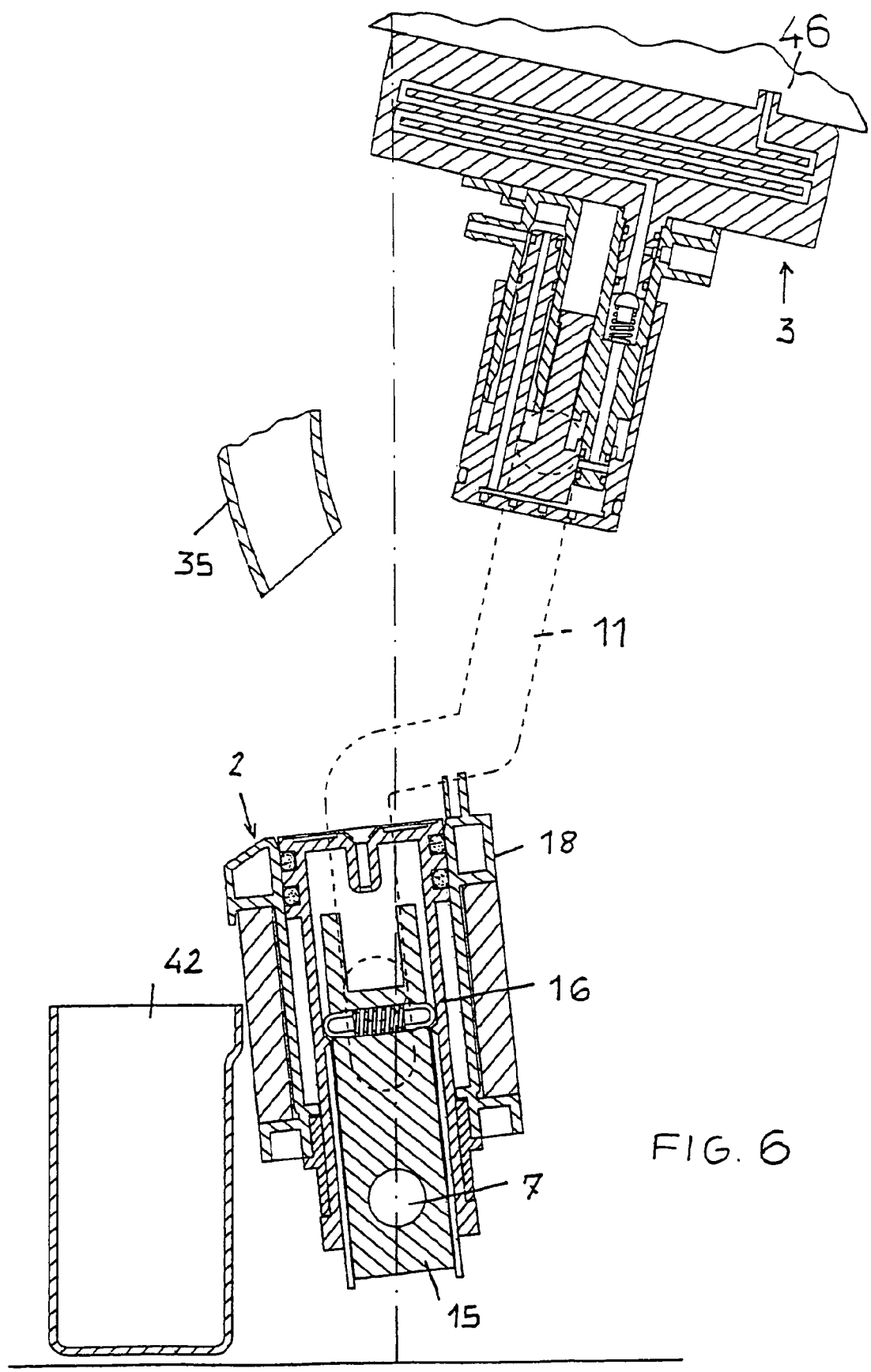
FIG. 6 shows a schematic cross-section of a portion of the machine in a rest position in which it is possible to extract the ground coffee container.

FIG. 6 schematically shows the machine in the rest position. When the command is sent to produce coffee, the motor 13 of the pivot-assembly 2a rotates the screw 12 and shifts the slide 9 along the screw 12, and pivots the container unit 2 around the pin 7.

Figure 7:
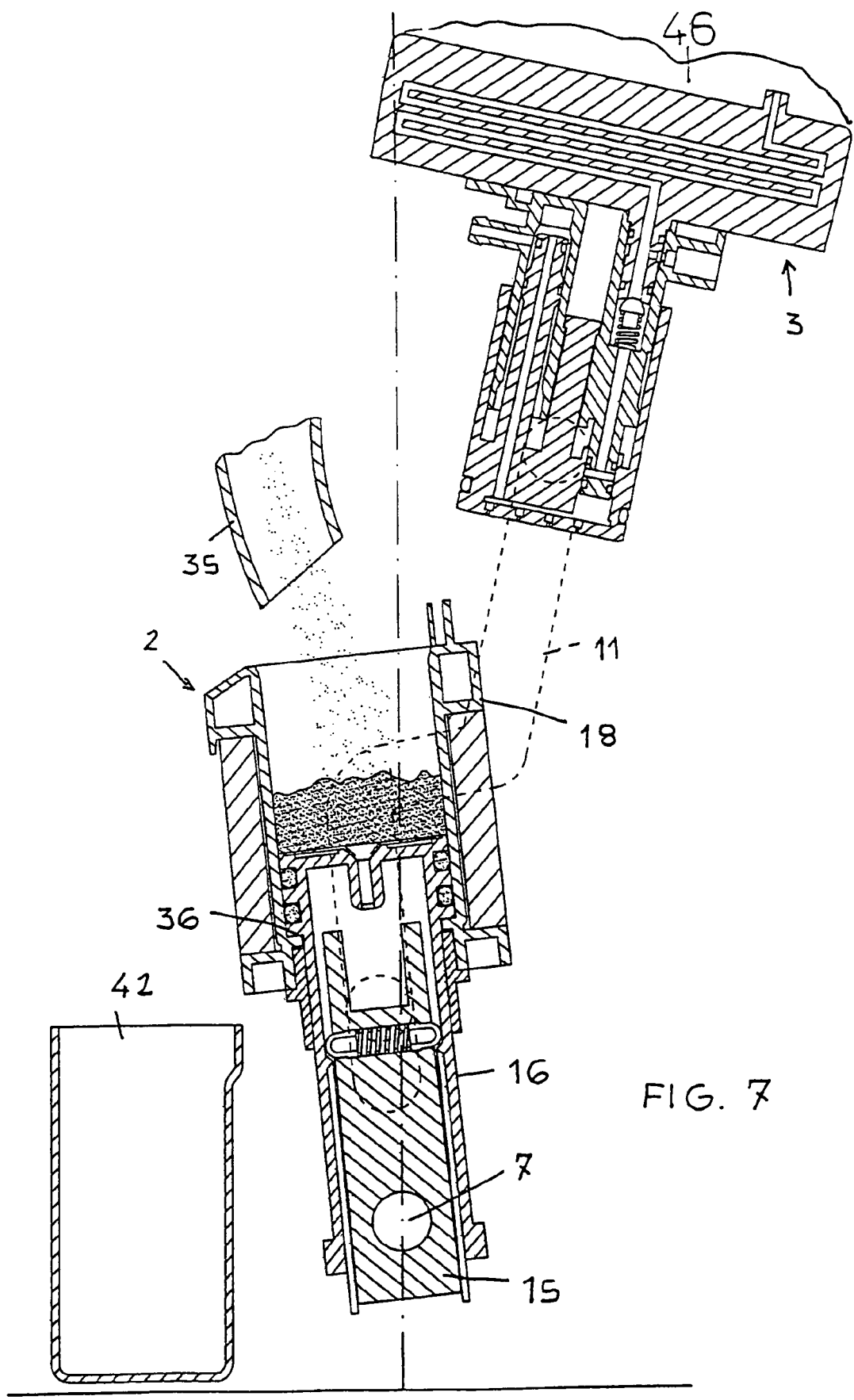
FIG. 7 shows a schematic cross-section of a portion of the machine in a position during the ground coffee supply action.

FIG. 7 shows a stage in which the element 18 of the container 2 is extended (to its maximum length because its abutments 36 are in contact with the corresponding abutments of element 16) to form a space to contain the ground coffee. A ground coffee dosing device 35 feeds a pre-established quantity of ground coffee into this space.

Figure 8:
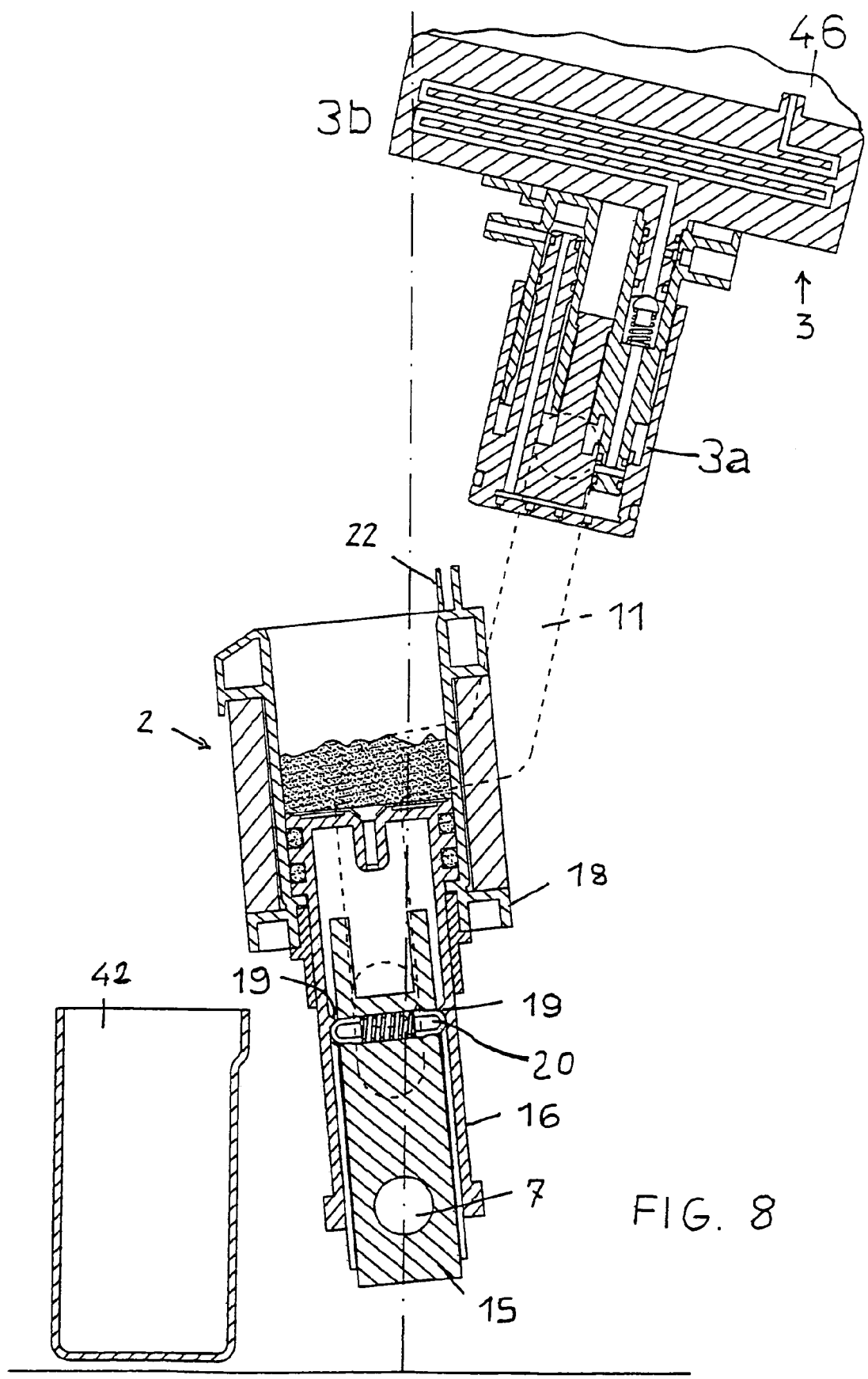
FIG. 8 shows a schematic cross-section of a portion of the machine during an operational stage.
Figure 9:
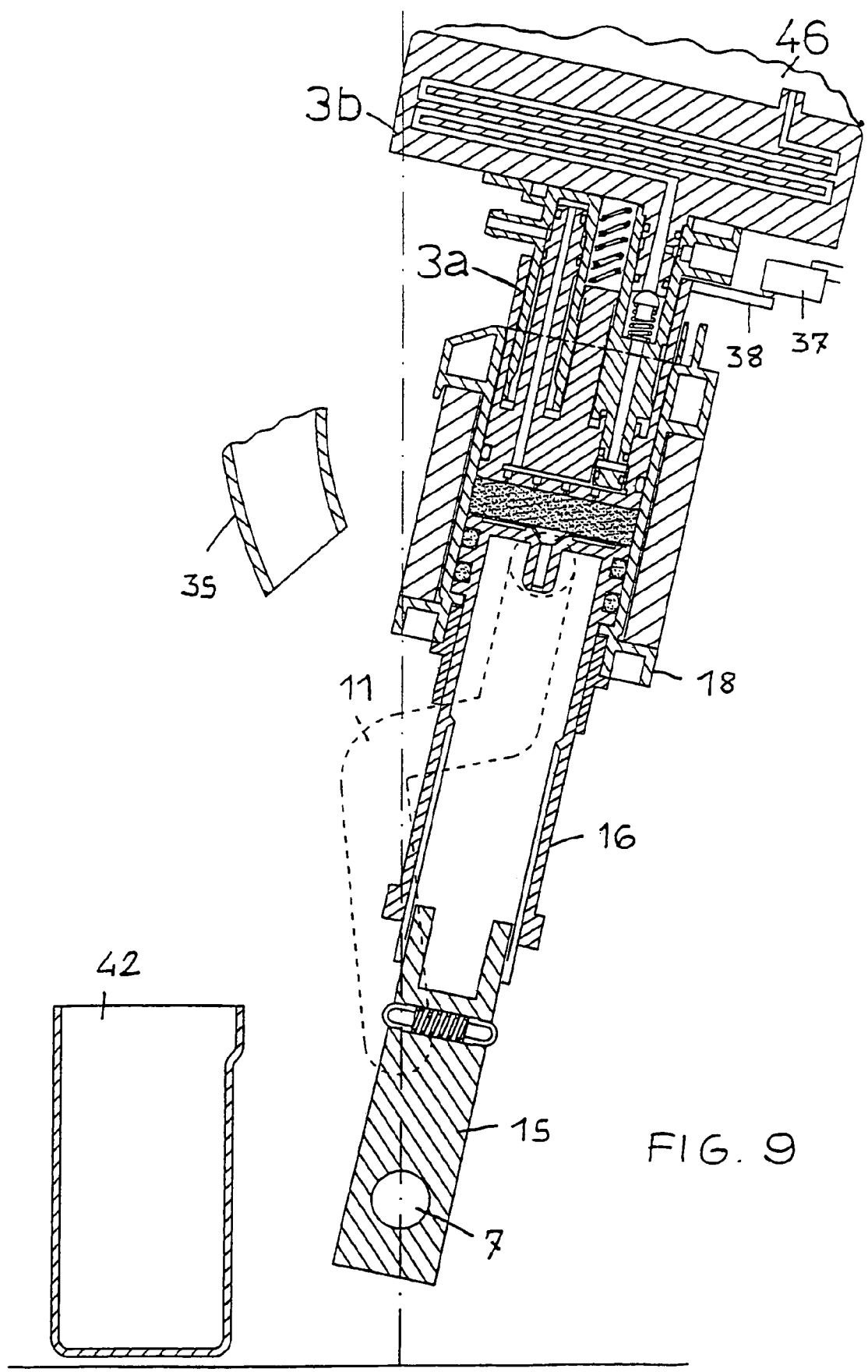
FIG. 9 shows a schematic cross-section of a portion of the machine in a position with the coffee container connected to the fluid supply device so that it forms the infusion chamber.

At this point, because of the gradual extension, the elastic abutments 20 move past the abutments 19 of element 16 (as shown in FIG. 8) and element 16 begins extension until a portion of the fluid supply device 3 engages into the element 18 forming the infusion chamber 4 inside which the ground coffee is compressed (as shown in FIG. 9). In this position the element 18 presses by means of an abutment 38 on a lower portion 3a of the device 3 and triggers a microswitch 37 that arrests the motion and provides the command for water supply into the infusion chamber 4.

As is shown in particular in FIGS. 8 and 9, before the container 2 is connected to the supply device 3 (and in particular to its lower portion 3a), this portion 3a is in a position spaced from an upper portion 3b of the device 3.

When the container 2 is connected to the supply device 3 it presses the lower portion 3a towards the upper portion 3b (as shown in FIG. 9) pushing them together and activating the microswitch 37 that controls the water supply to the infusion chamber 4 and the production of the coffee supplied to the user through a valve on the element 16.

Figure 12:
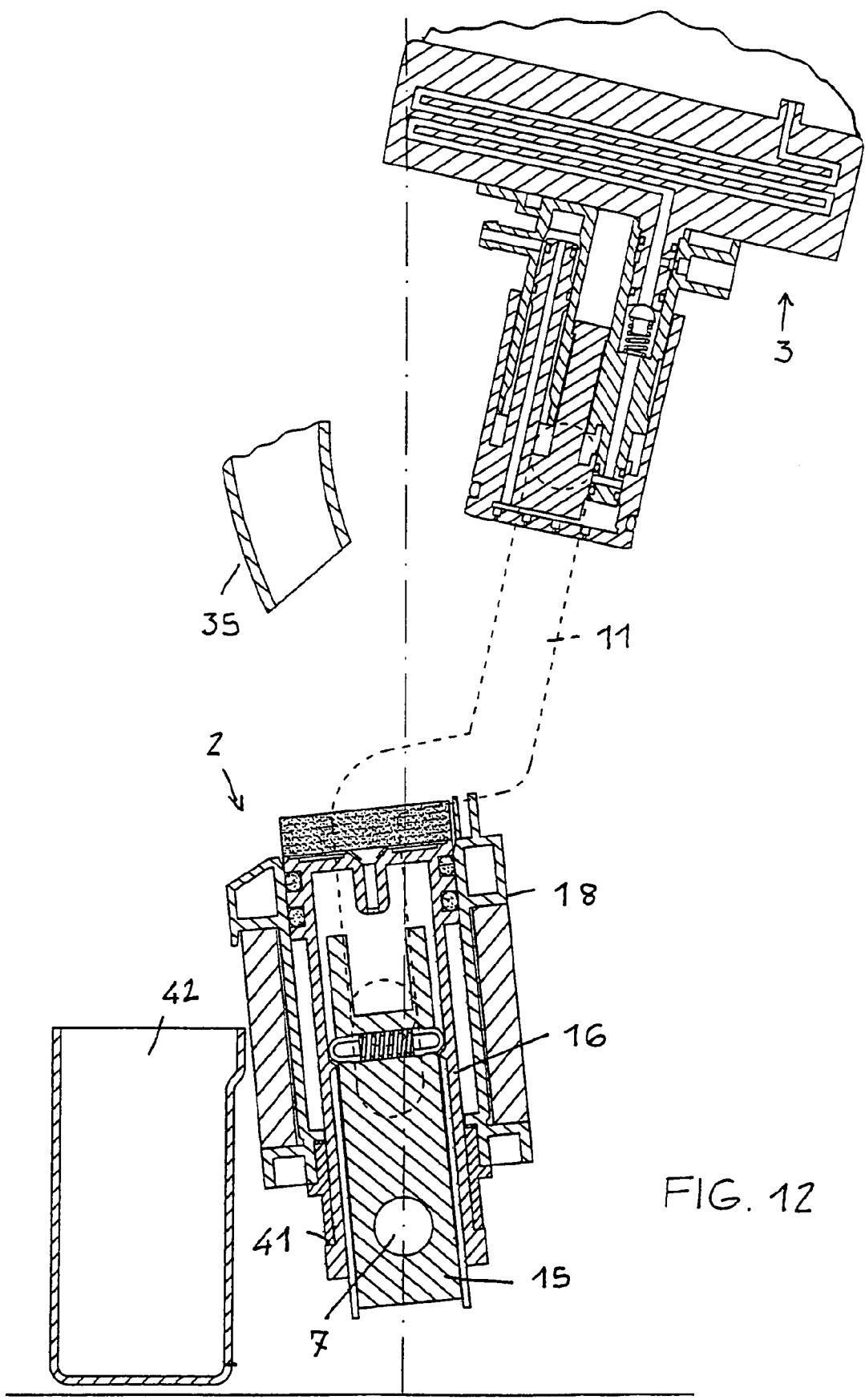

Following this, the ground coffee container 2 returns to the rest position, first sending the element 16 back onto the element 15 and maintaining the element 18 extended (until the abutments 20 are aligned with but not past the abutments 19). The element 18 returns onto element 16, bringing its abutments 41 onto the corresponding abutments of the element 16, and in this manner causing the elastic abutments 20 to pass over the abutments 19 and to move further on (FIG. 12).

Figure 13:
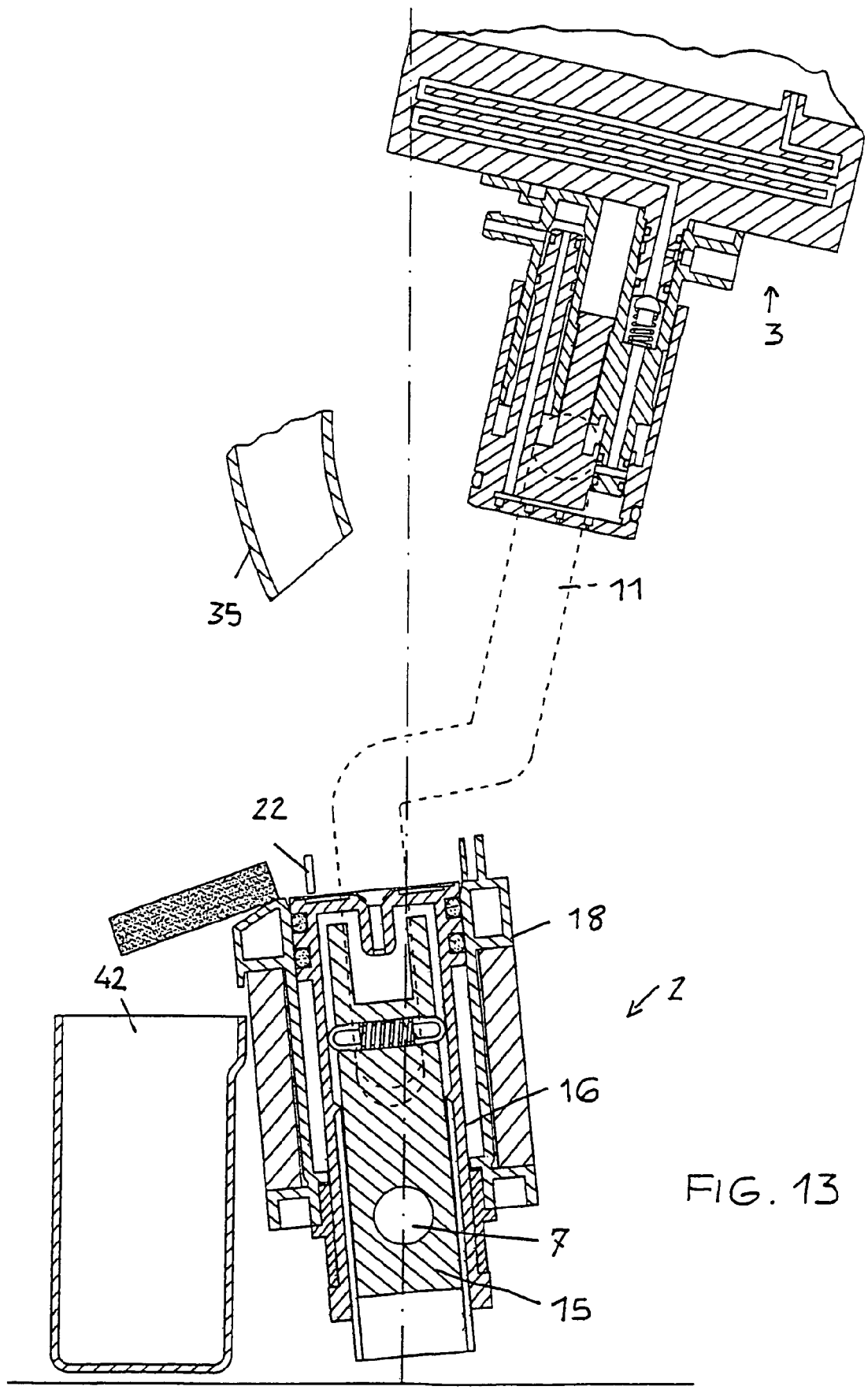
FIG. 13 shows a schematic cross-section of a portion of the machine in a position wherein the waste ground coffee is expelled from the container.

At this point, as shown in FIG. 13, the expulsion lever 22 expels the waste ground coffee in the form of a single compressed tablet. The ground coffee tablets are collected in a practical manner in a waste container 42.

Figure 14:
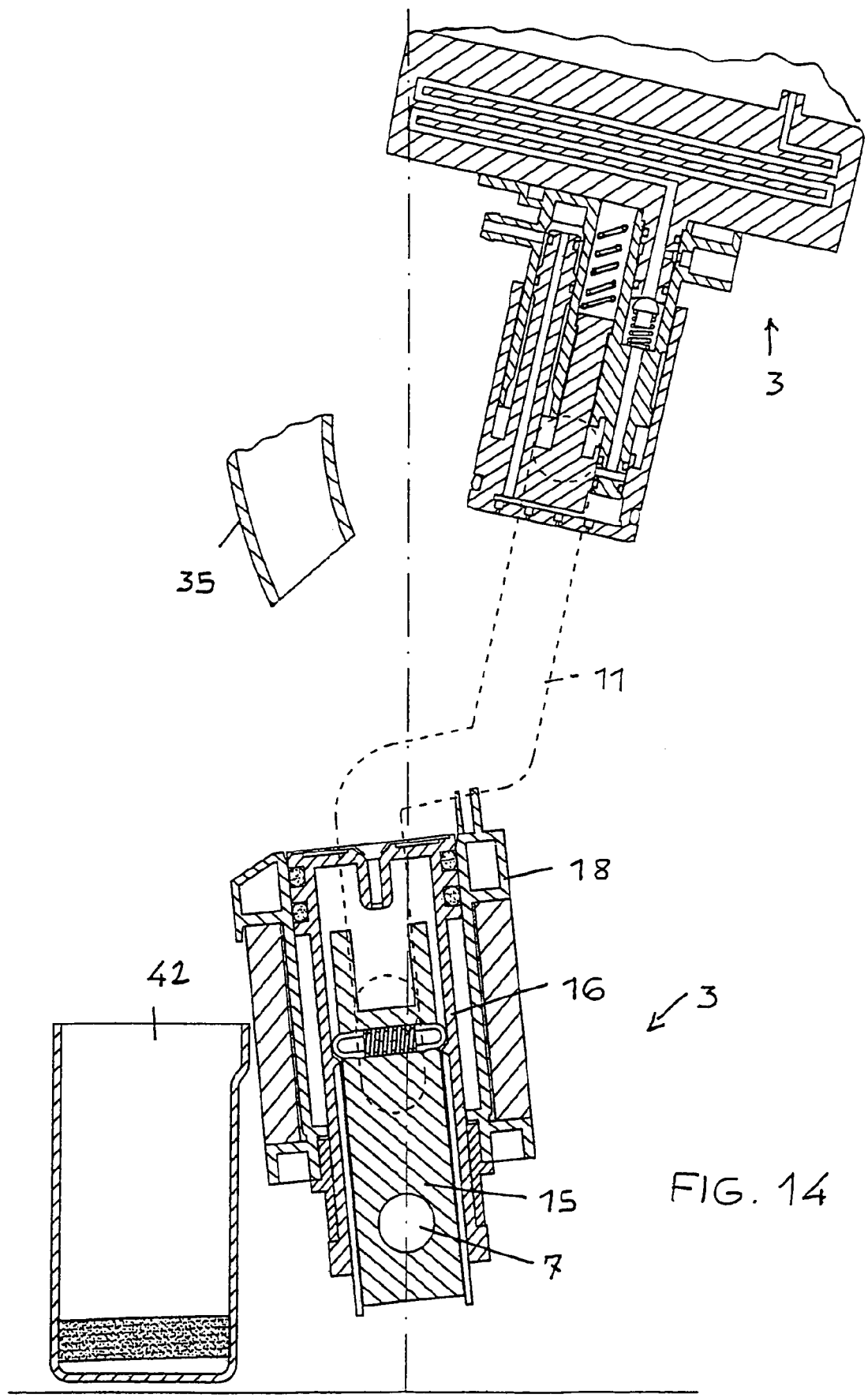
FIG. 14 shows a schematic cross-section of a portion of the machine during a return stage in the position after the expulsion of the waste ground coffee.

Last of all, the ground coffee container 2 is then partially extended, returning to its rest position with the abutments 20 opposite but above the abutments 19 (as shown in FIG. 14).

In a particularly advantageous embodiment, the machine 1 comprises safety means adapted to interrupt machine function in the case of any faulty conditions, especially in the connection between the third tubular element 18 and the lower portion 3a of the fluid supply device 3. In particular, the safety means comprise a position detector (not shown) adapted to detect the position of the third telescopic element 18 connected to an electronic control processor.

In the case of faulty machine function due to incorrect alignment between element 18 and portion 3a of device 3, for example, or the presence of ground coffee in the mechanical parts, or similar conditions, the electronic processor prevents the triggering of the microswitch 37 that commands the water supply to the infusion chamber until the element 18 has been set in its correct position.

With this system, the microswitch 37 cannot be triggered until the connection between element 18 and portion 3a of the device 3 is not performed correctly with element 18 at least in a predetermined position.

Moreover, after a certain time lapse following the connection between element 18 and portion 3a, the electronic processor will cut off the action of motion mechanism 2a.

In this way, if the microswitch or some other component is damaged, this system will prevent any further damage to the machine 1.

In addition, advantageously, acting together with the electronic processor, the detector is adapted to stop the element 18 in a pre-established position in relation to the dosing device 35.

When it is necessary to remove the ground coffee container 2 from machine 1, first the hook-up couplings 8 must be released from their seats on the slide, and element 18 must be slid off pin 7.

This way, the ground coffee container can be washed very easily because it does not involve moving the whole machine, and all parts are easily accessible, above all the filter.

In particular, in the example shown in the drawing the boiler 46 is located above the supply device 36. Moreover, above the boiler 46, the machine 1 is provided with a metal plate (preferably aluminum) adapted to absorb the dispersed heat from the boiler 46 so that it remains hot and acts as a support for keeping cups warm.

It has been demonstrated how the machine for producing coffee s according to the present invention results as particularly advantageous in that it can be washed very easily without risk of damage to the machine and without the need to handle heavy and cumbersome components.

The machine for producing coffee s conceived in this manner may be subject to numerous modifications and variants, all of which remain within the context of the present invention; moreover, all components can be replaced with elements that are technically equivalent.

The invention claimed is:

1. A coffee machine comprising:
a housing;
an upper supply part on the housing and a lower supply part movable relative to the upper part between an upper position and a lower position;
a container adapted to hold a charge of coffee grounds and fittable with the lower supply part;
guide means on the housing and container including a slide and a pivot for displacement of the container between
a coffee-making position fitted with the lower part and pressing the lower part into the upper position, and
a loading/emptying position spaced from the lower part and tipped away from the lower part, whereby in the loading/emptying position coffee grounds can be loaded into or cleared out of the container, the container being separable from the housing in the loading/emptying position;
supply means connected through the upper supply part with the lower supply part for forcing a hot fluid through the coffee grounds in the container only in the coffee-making position of the container;
a plurality of telescoping parts extensible to form an infusion chamber capable of holding the coffee grounds and fittable with the supply lower part and collapsible for clearing of the grounds from the chamber; and
abutment means for sequential shifting of the parts on movement from a collapsed position to an extended position.

2. The coffee machine defined in claim 1 wherein the pivot is below the slide.

3. The coffee machine defined in claim 2 wherein the guide means further includes a nonstraight guide along which the slide is displaceable.

4. The coffee machine defined in claim 1, further comprising
a clearing element that can sweep across one of the parts in the collapsed position for clearing the coffee grounds from the chamber.

5. The coffee machine defined in claim 1, further comprising
a latch lever for securing together the parts on separation of the container from the housing.

6. The coffee machine defined in claim 1, further comprising
safety means for preventing operation of the supply means when the parts are improperly fitted to the lower supply part.

7. The coffee machine defined in claim 6 wherein the safety means includes position detecting means on the housing for detecting the position of one of the telescoping parts.

8. A coffee machine comprising:
a housing;
an upper supply part on the housing and a lower supply part movable relative to the upper part between an upper position and a lower position;
a container adapted to hold a charge of coffee grounds and fittable with the lower supply part;
guide means on the housing and container including a slide and a pivot for displacement of the container between
a coffee-making position fitted with the lower part and pressing the lower part into the upper position, and
a loading/emptying position spaced from the lower part and tipped away from the lower part, whereby in the loading/emptying position coffee grounds can be loaded into or cleared out of the container, the container being separable from the housing in the loading/emptying position; and
supply means connected through the upper supply part with the lower supply part for forcing a hot fluid through the coffee grounds in the container only in the coffee-making position of the container; and
safety means including spring-loaded teeth engageable between the housing and the container for preventing operation of the machine when the container is not in a position fitted perfectly to the housing.

9. The coffee machine defined in claim 8 wherein the safety means include a cover engageable with the container and a switch operable by the cover when the cover engages the machine in the perfectly fitted position of the container.

10. A coffee machine comprising:
a housing;
an upper supply part on the housing and a lower supply part movable relative to the upper part between an upper position and a lower position;
a container adapted to hold a charge of coffee grounds and fittable with the lower supply part;
guide means on the housing and container including a slide and a Divot for displacement of the container between
a coffee-making position fitted with the lower part and pressing the lower part into the upper position, and
a loading/emptying position spaced from the lower part and tipped away from the lower part, whereby in the loading/emptying position coffee grounds can be loaded into or cleared out of the container, the container being separable from the housing in the loading/emptying position;
supply means connected through the upper supply part with the lower supply part for forcing a hot fluid through the coffee grounds in the container only in the coffee-making position of the container; and
means including a valve upstream of the supply means openable to supply water thereto, the valve including
a hollow valve body,
a piston slidable in the valve body and having an end face forming a variable-volume compartment with the valve body, and
three annular outwardly open grooves formed on the piston, the piston having an end face forming a variable-volume compartment with the valve body, the piston further having a first duct extending between one of the grooves and the compartment and a second duct extending between another of the grooves and the exterior.

\* \* \* \* \*